United States Patent
Park et al.

(10) Patent No.: US 12,496,822 B2
(45) Date of Patent: Dec. 16, 2025

(54) APPARATUS AND METHOD FOR FORMING FILM

(71) Applicant: SEMES CO., LTD., Cheonan-si (KR)

(72) Inventors: Sang Hyun Park, Busan (KR); Moo Hyung Yi, Cheonan-si (KR); Sung Ho Choi, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 144 days.

(21) Appl. No.: 18/439,488

(22) Filed: Feb. 12, 2024

(65) Prior Publication Data

US 2024/0316923 A1  Sep. 26, 2024

(30) Foreign Application Priority Data

Mar. 20, 2023  (KR) .................. 10-2023-0035952

(51) Int. Cl.
*B41J 2/07*  (2006.01)
*B41J 29/38*  (2006.01)

(52) U.S. Cl.
CPC ................ *B41J 2/07* (2013.01); *B41J 29/38* (2013.01)

(58) Field of Classification Search
CPC ..... B41J 2/07; B41J 29/38; B41J 3/407; B41J 29/393; B29C 41/24; B29C 41/365; B29C 41/52; B29L 2007/00; B41M 5/0047
See application file for complete search history.

(56) References Cited

U.S. PATENT DOCUMENTS

2017/0266957 A1\* 9/2017 Lee ..................... G02F 1/13306
2021/0151531 A1   5/2021 Jo et al.

FOREIGN PATENT DOCUMENTS

| CN | 112820757 | 5/2021 |
| CN | 111497448 | 7/2022 |
| KR | 10-2017-0109719 | 8/2020 |

\* cited by examiner

*Primary Examiner* — Bradley W Thies
(74) *Attorney, Agent, or Firm* — WOMBLE BOND DICKINSON (US) LLP

(57) ABSTRACT

The present disclosure provides a method and apparatus for forming a film, capable of for forming a film on an image in which a plurality of shapes overlap, wherein the method for forming a film includes setting a first shape within a target region; setting a second shape, at least partially overlapping the first shape; setting an edge processing profile applied to an edge portion of the first shape and an edge portion of the second shape; and forming a film on the edge portion of the first shape and the edge portion of the second shape, based on the edge processing profile.

20 Claims, 9 Drawing Sheets

APPARATUS AND METHOD FOR FORMING FILM

CROSS-REFERENCE TO RELATED APPLICATION (S)

This application claims benefit of priority to Korean Patent Application No. 10-2023-0035952 filed on Mar. 20, 2023 in the Korean Intellectual Property Office, the disclosure of which is incorporated herein by reference in its entirety.

BACKGROUND

1. Field

The present disclosure relates to an apparatus and method for forming a film.

2. Description of Related Art

When printing an image of a simple shape such as a rectangle, it has been necessary to control a film thickness only for an outermost portion of the image. However, in recently produced products, there is an increasing demand for full screens in which a bezel of a display is minimized, and various sensors, including cameras, are located inside a display screen.

In order to dispose a camera inside the display screen, a display with printed images including overlapping shapes should be manufactured. When printing an image including various shapes, a technology is required to independently control an edge of each shape and precisely control a thickness of the film formed at a boundary between the shapes.

However, when using the conventional method for forming a film, there may be a problem in that it may be difficult to control the thickness of the film at the boundary between the shapes when printing an image in which other shapes exist in the shape.

(Patent Document 1) KR 10-2017-0109719 A

SUMMARY

An aspect of the present disclosure is to provide an apparatus and method for forming a film that can print an image in which a plurality of shapes overlap.

In an aspect of the present disclosure, the purpose of the present disclosure is to provide an apparatus and method for forming a film capable of independently forming a film on an edge of each shape in an image in which a plurality of shapes overlap.

In order to achieve the above-described object, an aspect of the present disclosure is to provide an apparatus and method for forming a film as follows.

In an embodiment of the present disclosure, a method for forming a film is provided, the method including: setting a first shape within a target region; setting a second shape, at least partially overlapping the first shape; setting an edge processing profile applied to an edge portion of the first shape and an edge portion of the second shape; and forming a film on the edge portion of the first shape and the edge portion of the second shape, based on the edge processing profile.

In an embodiment of the present disclosure, an apparatus for forming a film is provided, the apparatus including: a substrate disposition unit on which a substrate including a target region is disposed; a film forming unit for forming a film on a preset image on the substrate; and a control unit controlling the film forming unit, wherein the control unit sets a first shape within the target region, sets a second shape, at least partially overlapping the first shape, sets an edge processing profile applied to an edge portion of the first shape and an edge portion of the second shape, and controls the film forming unit to form a film on the edge portion of the first shape and the edge portion of the second shape, based on the edge processing profile.

In an embodiment of the present disclosure, an apparatus for forming a film is provided, the apparatus including: a substrate disposition unit on which a substrate including a target region is disposed; a nozzle discharging ink onto the substrate; a nozzle moving unit moving the nozzle; and a control unit controlling the nozzle and the nozzle moving unit, wherein the control unit sets a first shape, a second shape, which is a hole shape disposed inside the first shape, and a third shape, which is a hole shape disposed inside the second shape, within the target region, sets an edge processing profile including target film thickness information and direction information for forming a film according to a distance from an edge portion of the first shape, an edge portion of the second shape, and an edge portion of the third shape, controls a discharge amount of the nozzle to form a film on the edge portion of the second shape in a second shape expansion direction from an edge line of the second shape outwardly of the second shape, based on the edge processing profile, and controls the discharge amount of the nozzle to form a film on the edge portion of the third shape in a third shape reduction direction from an edge line of the third shape inwardly of the third shape, based on the edge processing profile.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
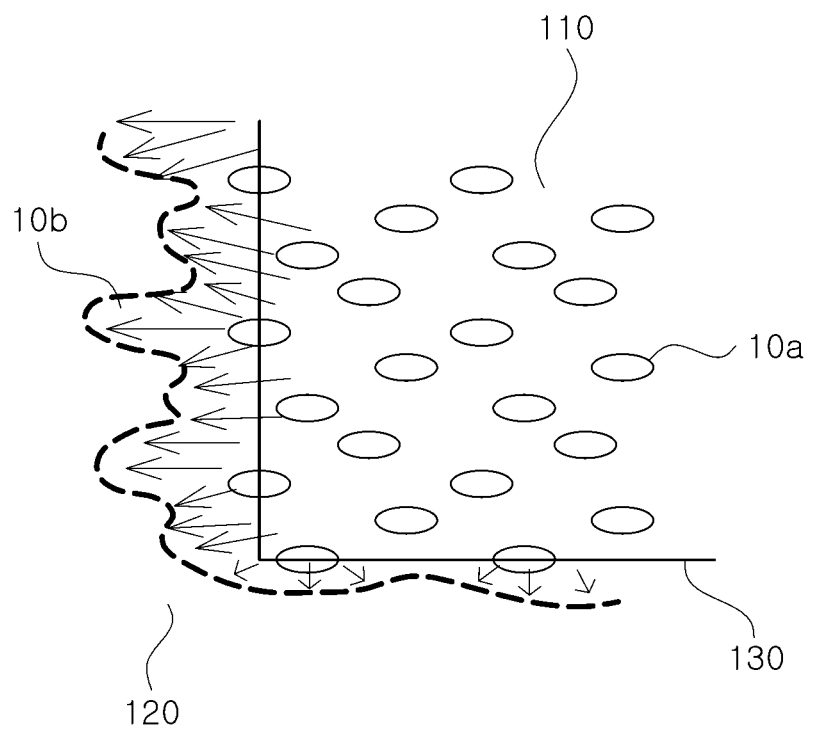
FIG. 1 is a schematic diagram illustrating a conventional method for forming a film.

Hereinafter, embodiments will be described in detail so that those skilled in the art may easily practice the present disclosure with reference to the accompanying drawings. However, in describing an embodiment in detail, if it is determined that a detailed description of a related known function or configuration may unnecessarily obscure the gist of the present disclosure, the detailed description will be omitted. In addition, the same reference numerals are used throughout the drawings for parts having similar functions and actions. In addition, in the present specification, terms such as 'on,' 'upper portion,' 'upper surface,' 'below,' 'lower portion,' 'lower surface,' 'side' and the like are based on the drawings, and may be changed depending on the direction in which components are actually disposed.

In addition, throughout the specification, when a part is said to be 'connected' to another part, it is not only 'directly connected,' but also 'indirectly connected' with other components therebetween. Further, 'including' a certain component means that other components may be further included, rather than excluding other components unless otherwise stated.

FIG. 1 is a schematic diagram illustrating a conventional method for forming a film. Referring to FIG. 1, an image to be printed may include a film forming region 110 in which a film is to be formed and a region in which a film is not formed 120 in which a film is not to be formed. In a film forming process, ink 10a is supplied onto the film forming region 110 and is not supplied onto the region in which a film is not formed 120. That is, a target thickness of the film formed by ink on the region in which a film is not formed 120 is 0.

In order to print a high-quality image, a processing technology is required to accurately distinguish both regions at a boundary between the film forming region 110 and the region in which the film is not formed 120. However, in the vicinity of the boundary 130 between the film forming region 110 and the region in which the film is not formed 120, ink on a side of the film forming region 110 may flow toward the region in which the film is not formed 120, or as ink on the side of the film forming region 110 spreads, an overflow 10b invading the region in which the film is not formed 120 may occur.

Conventionally, it was possible to control the ink discharge amount for only one edge included in an image to be printed. Therefore, in the prior art, there was a problem in that it was difficult to control a film thickness at the boundary between shapes in an image in which a plurality of shapes overlap. For example, when printing an image in which a hole shape 220 overlaps an inside of a cell shape 210 as shown in FIG. 2, there was a problem in that it was difficult to control the film thickness at the boundary between the cell shape 210 and the hole shape 220.

The present disclosure is intended to print an image in which a plurality of shapes overlap, and in particular, to independently form a film on an edge of each shape in an image in which a plurality of shapes overlap. The present disclosure may be applied to printing an image in which a plurality of shapes overlap in whole or in part.

Figure 2:
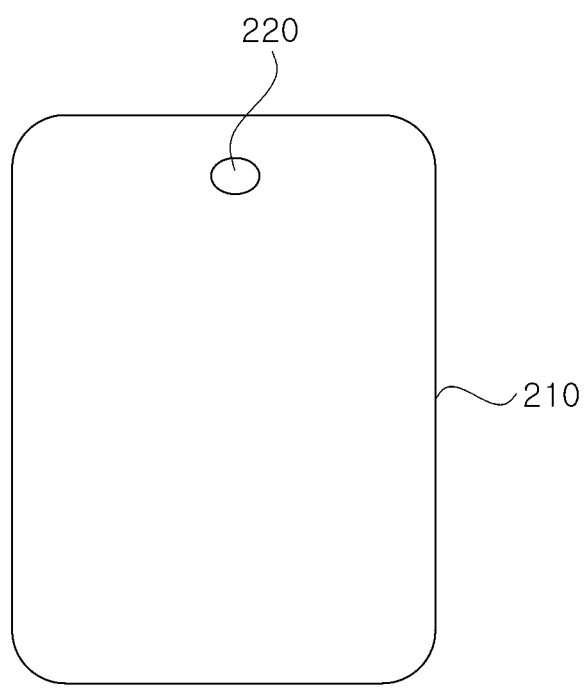
FIG. 2 is a schematic diagram of an image in which a film is formed according to an embodiment of the present disclosure.

The present disclosure may be applied to printing an image in which the hole shape 220 overlaps the inside of the cell shape 210, as shown in FIG. 2, and thereby, Hole In Active Area (HIAA) products may be produced. The hole shape 220 may be for disposing, for example, a camera lens, sensor, receiver, microphone, or speaker.

FIG. 2 illustrates a case in which only one hole shape 220 exists inside the cell shape 210, but in another embodiment, a plurality of hole shapes may exist. When a plurality of hole shapes exist, each of the hole shapes may have a different shape.

FIG. 2 illustrates a case in which the hole shape 220 is located on an inner upper side of the cell shape 210, but a position of the hole shape 220 is not limited to the example shown in FIG. 2. In addition, FIG. 2 illustrates a case in which the cell shape 210 has a square shape with a rounded corner, and the hole shape 220 has a circular shape, but the shape of the cell shape 210 and the shape of the hole shape 220 are not limited to the example shown in FIG. 2.

Figure 3:
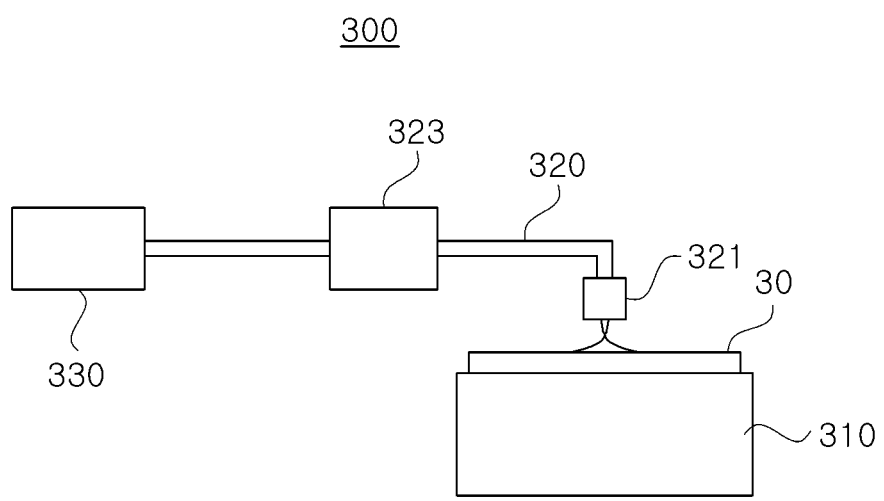
FIG. 3 is a side schematic diagram of an apparatus for forming a film according to an embodiment of the present disclosure.

FIG. 3 illustrates a side schematic view of an apparatus for forming a film 300 according to an embodiment of the present disclosure. Referring to FIG. 3, the apparatus for forming a film 300 may include a substrate disposition unit 210 on which a substrate 30 including a target region is disposed, a film forming processing unit for forming a film on a preset image on the substrate 30, and a control unit 330 controlling the film forming unit 320.

The film forming unit 320 includes a nozzle 321 discharging ink onto the substrate 30. The nozzle 321 is controlled to discharge ink onto a region set as a film forming region within the target region on the substrate 30. In addition, the nozzle 321 is controlled to not discharge ink onto a region other than the film forming region within the target region, that is, a region in which a film is not formed.

For example, a discharge amount of ink discharged from the nozzle may be controlled by adjusting an amount of ink discharged from one or more discharge heads or a discharge speed of ink.

For another example, the amount of ink discharged from the nozzle 321 may be controlled by adjusting the number of discharge heads discharging ink among the plurality of discharge heads included in the nozzle 321.

The film forming unit 320 may further include a nozzle moving unit 323 connected to the nozzle 321 and moving the nozzle 321 in a horizontal or vertical direction. The nozzle moving unit 323 may include, for example, a motor.

In an embodiment, the nozzle moving unit 323 may move the nozzle 321 along a preset moving path. The nozzle 321 may be moved by the nozzle moving unit 323 and controlled to discharge ink onto a specific region and not discharge ink onto other regions.

The nozzle 321 may be controlled to discharge different amounts of ink depending on the region while being moved by the nozzle moving unit 323.

The control include one or more information processing apparatuses. The control unit 330 may set one or more shapes included in a preset image to be printed. The control unit 330 may set an edge processing profile applied to an edge portion of a set shape.

The control unit 330 may set a first shape within a target region on the substrate 30 and set a second shape, at least partially overlapping the first shape. For example, the second shape may be a hole shape located inside the first shape.

For example, when the apparatus for forming a film 300 prints an image as shown in FIG. 2, the control unit 330 may set a cell shape 210 within the target region on the substrate 30, and set a hole shape 220 overlapping the cell shape 210.

The control unit 330 may set an edge processing profile applied to the edge portion of the first shape and the edge portion of the second shape. The edge processing profile may include at least one of target film thickness information, direction information for forming a film, and position information of a region in which a film is not formed, according to a distance from the edge portion of the shape.

A thickness of the film formed in the target region may be expressed as film forming density. For example, a region in which the film forming density is set to 0% refers to a region in which a film is not formed. In addition, a region in which the film forming density is set to 100% may be film-formed so that the target film thickness is twice that of a region in which the film forming density is set to 50%.

Here, the edge portion of the shape refers to a region near an edge line, which is an outline determining a form of the shape. The edge portion of the shape may include an inner region of the shape adjacent to the edge line or an outer region of the shape adjacent to the edge line.

The control unit 330 may set a first edge processing profile including target film thickness information and direction information for forming a film according to a distance from an edge portion of a first shape. In addition, the control unit 330 may set a second edge processing profile including target film thickness information and direction information for forming a film according to a distance from an edge portion of a second shape. The second edge processing profile may be applied independently of the first edge processing profile.

The control unit 330 may control a film forming unit 320. For example, the control unit 330 may control whether the nozzle 321 included in the film forming unit 320 discharges ink or not, a discharge amount of ink discharged from the nozzle 321, a moving speed of the nozzle 321 by the nozzle moving unit 323, or a moving path of the nozzle 321 by the nozzle moving unit 323.

The control unit 330 may control the film forming unit 320 to form a film on the edge portion of the first shape and the edge portion of the second shape in one of a shape expansion direction and a shape reduction direction based on the edge processing profile.

The control unit 330 may control the film forming unit 320 to form a film on an edge portion of the first shape, based on the first edge processing profile. The control unit 330 may control the film forming unit 320 to form a film on an edge portion of the second shape, based on a second edge processing profile applied independently of the first edge processing profile.

For example, the control unit 330 may control a discharge amount of the nozzle 321 to form a film on an edge portion of the second shape in a second shape expansion direction from an edge line of the second shape outwardly of the second shape. The control unit 330 may control the amount of ink discharged while the nozzle 321 moves to increase or decrease when viewed from the second shape expansion direction.

For another example, the control unit 330 may control the discharge amount of the nozzle 321 to form a film on the edge portion of the second shape in a second shape reduction direction from the edge line of the second shape inwardly of the second shape. The control unit 330 may control the amount of ink discharged while the nozzle 321 moves to increase or decrease when viewed from the second shape reduction direction.

Figure 9:
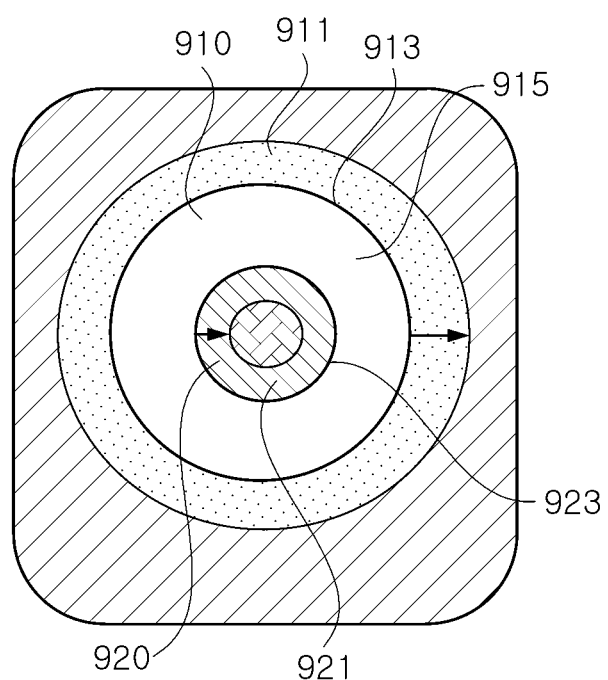
FIG. 9 is a schematic diagram for illustrating a method for forming a film on an edge portion of a shape according to another embodiment of the present disclosure.

The control unit 330 may further set a third shape, at least partially overlapping the first or the second shape set within the target region on the substrate 30. For example, the third shape may be another hole shape located inside the hole shape as shown in FIG. 9.

The control unit 330 may set a third edge processing profile including target film thickness information and direction information for forming a film according to a distance from an edge portion of a third shape. The third edge processing profile may be applied independently of the first edge processing profile and the second edge processing profile.

The control unit 330 may control the film forming unit 320 to form a film on an edge portion of a third shape, based on a third edge processing profile.

For example, the control unit 330 may control a discharge amount of the nozzle 321 to form a film on the edge portion of the third shape in a third shape expansion direction from an edge line of the third shape outwardly of the third shape. The control unit 330 may control the amount of ink discharged while the nozzle 321 moves to increase or decrease when viewed from the third shape expansion direction.

For another example, the control unit 330 may control the discharge amount of the nozzle 321 to form a film on the edge portion of the third shape in a third shape reduction direction from the edge line of the third shape inwardly of the third shape. The control unit 330 may control the amount of ink discharged while the nozzle 321 moves to increase or decrease when viewed from the third shape reduction direction.

The control unit 330 may set an edge processing profile including one or more layers. The layer may include region information and target film thickness information for forming a film. For example, the edge processing profile may include a plurality of layers with different target film thicknesses.

The control unit 330 may control the film forming unit 320 to sequentially apply a plurality of layers to regions with the same target film thickness among the target regions on the substrate 30.

Figure 4:
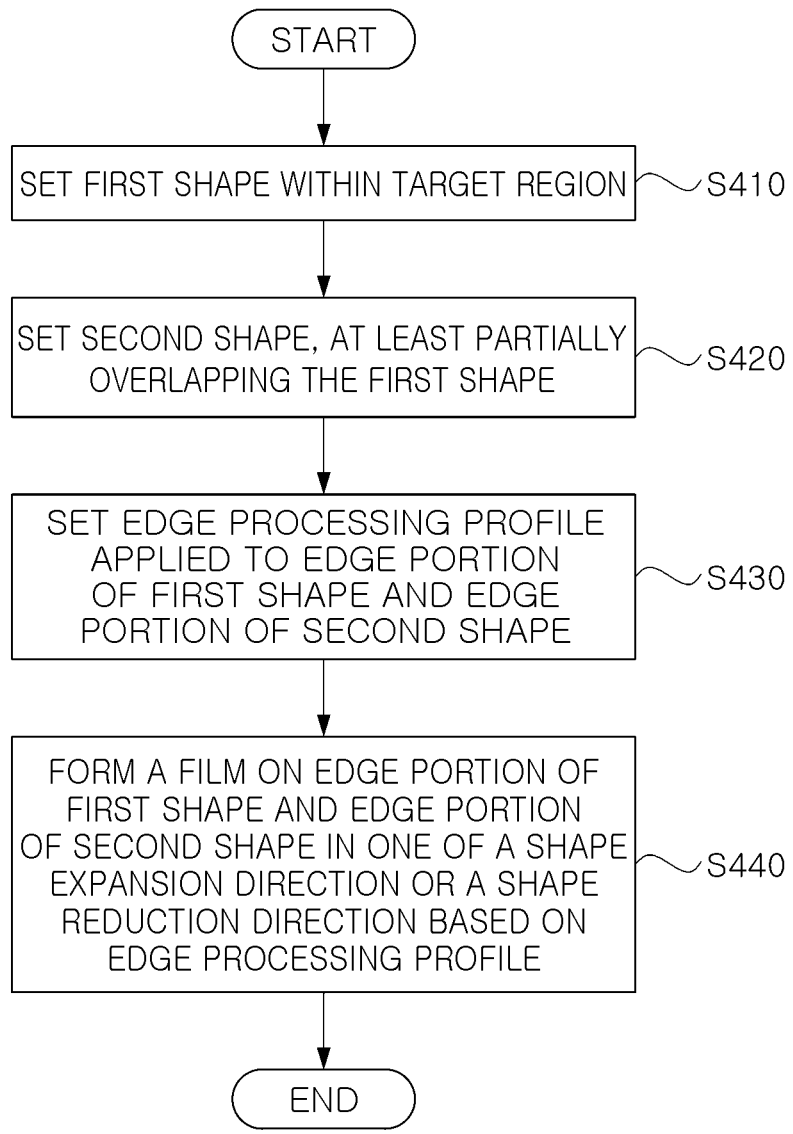
FIG. 4 is a flowchart of a method for forming a film according to an embodiment of the present disclosure.

FIG. 4 is a flowchart of a method for forming a film according to an embodiment of the present disclosure. As illustrated in FIG. 4, the method for forming a film may include setting a first shape in a target region (S410), setting a second shape, at least partially overlapping the first shape (S420), setting an edge processing profile applied to an edge portion of the first shape and an edge portion of the second shape (S430), and forming a film on the edge portion of the first shape and the edge portion of the second shape in one of a shape expansion direction and a shape reduction direction based the edge processing profile (S440).

The edge processing profile may include at least one of target film thickness information, direction information for forming a film, and position information of a region in which a film is not formed, according to a distance from an edge portion of a shape. Forming a film on an edge portion of a shape may be performed based on information included in the edge processing profile.

The edge portion of the shape refers to a region near an edge line, which is an outline determining a form of the shape. The edge portion of the shape may include an inner region of the shape adjacent to the edge line or an outer region of the shape adjacent to the edge line.

Figure 5:
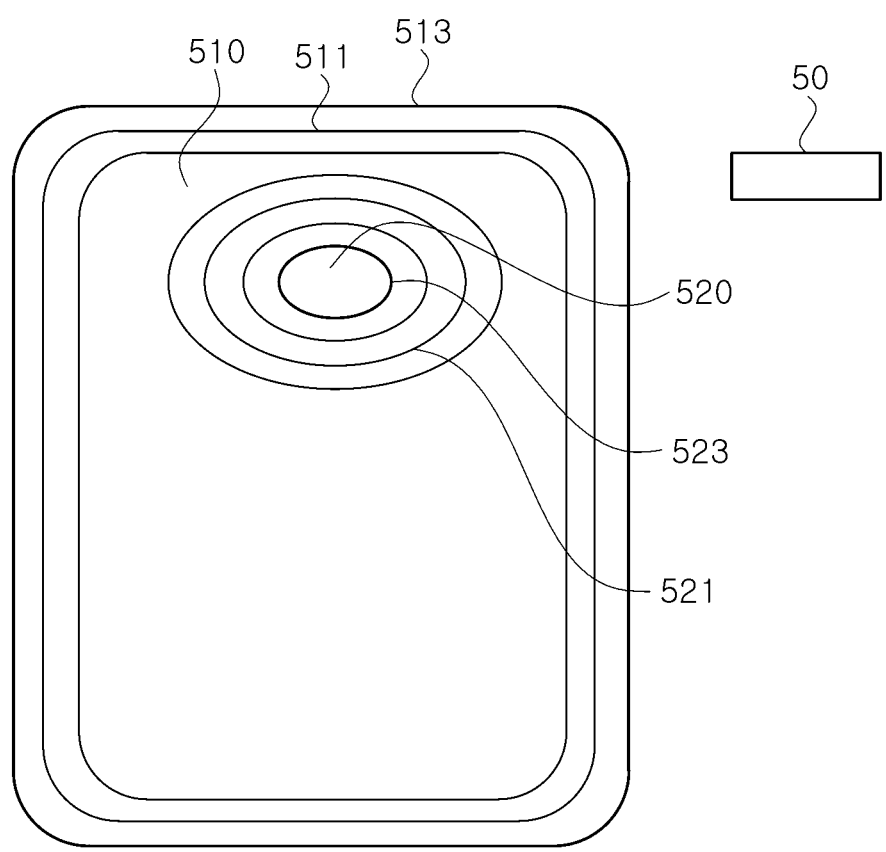
FIG. 5 is a schematic diagram of an image in which a film is formed according to an embodiment of the present disclosure.

FIG. 5 is a schematic diagram of an image in which a film is formed according to an embodiment of the present disclosure. The embodiment of the present disclosure will be described in detail with reference to FIGS. 4 and 5 together.

As shown in FIG. 5, in order to print a preset image on a substrate, a first shape 510 and a second shape 520, at least partially overlapping the first shape 510 may be set in a target region (S410, S420). For example, the second shape 520 may be a hole shape located inside the first shape 510.

The method for forming a film according to the present disclosure may further include an operation of setting a tag cell 50. The tag cell 50 may be set to display a reference position for forming a film.

Setting the edge processing profile (S430) may include setting a first edge processing profile and setting a second edge processing profile.

An edge portion 511 of a first shape refers to a region near an edge line 513 of the first shape. The first edge processing profile may include target film thickness information direction information for forming a film according to a distance from the edge portion 511 of the first shape.

An edge portion 521 of a second shape refers to a region near an edge line 523 of the second shape. The second edge processing profile may include target film thickness information and direction information for forming a film according to a distance from the edge portion 521 of the second shape.

As shown in FIG. 5, the second edge processing profile may be set to form a film on the edge portion 521 of the second shape in a second shape expansion direction from the edge line 523 of the second shape outwardly of the second shape 520.

In another embodiment, the second edge processing profile may be set to form a film on the edge portion of the second shape in a second shape reduction direction from the edge line 523 of the second shape inwardly of the second shape 520.

Figure 6:
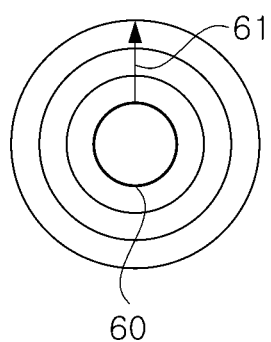
FIG. 6 is a schematic diagram for illustrating a method for forming a film on an edge portion of a shape according to an embodiment of the present disclosure.

FIG. 6 illustrates a case in which a film is formed on an edge portion of a shape in a shape expansion direction. As shown in FIG. 6, the film may be formed on the edge portion of the shape in a shape expansion direction 61, a direction from an edge line 60 of the shape outwardly of the shape.

Figure 7:
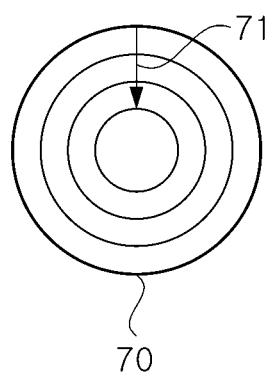
FIG. 7 is a schematic diagram for illustrating a method for forming a film on an edge portion of a shape according to an embodiment of the present disclosure.

FIG. 7 illustrates a case in which a film is formed on an edge portion of a shape. As shown in FIG. 7, the film may be formed on the edge portion of the shape in a shape reduction direction 71, a direction from an edge line 70 of the shape inwardly of the shape.

Figure 8:
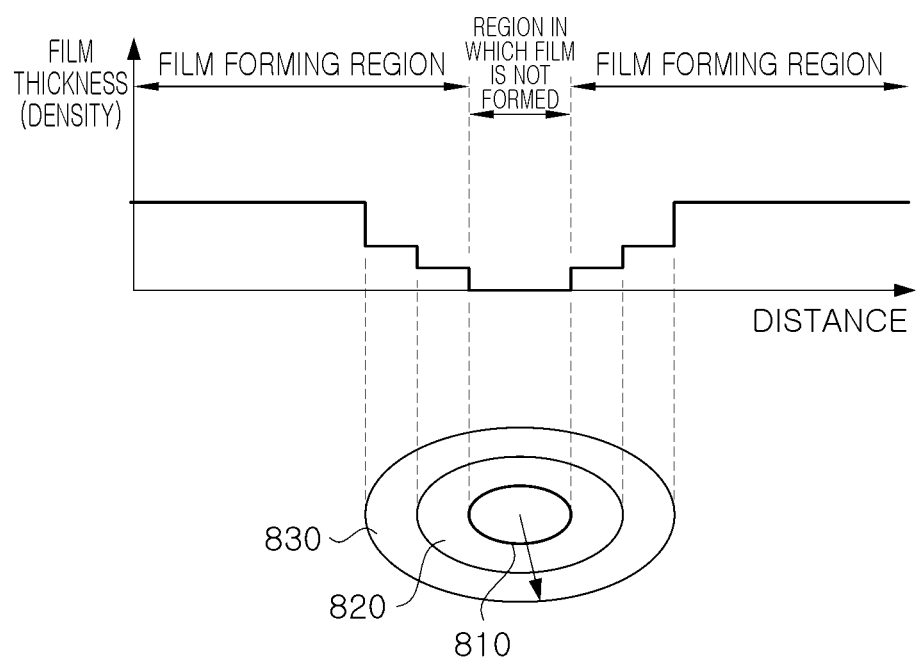
FIG. 8 illustrates a method of applying an edge processing profile according to an embodiment of the present disclosure.

FIG. 8 illustrates a method of applying an edge processing profile according to an embodiment of the present disclosure. The edge processing profile may include target film thickness information, direction information for forming a film, and position information of a region in which a film is not formed, according to a distance from an edge portion of a shape.

The film may be formed while a discharge amount of ink is controlled according to the target film thickness information according to the distance from the edge portion of the shape shown in FIG. 8.

According to the edge processing profile shown in FIG. 8, the film may be formed in a shape expansion direction from an edge line 810 of a shape outwardly of the shape. In addition, the interior of the shape may be set as a region in which a film is not formed.

The edge processing profile may include a plurality of layers with different target film thicknesses. The plurality of layers may be sequentially applied to regions with the same target film thickness. For example, according to the edge processing profile shown in FIG. 8, any one layer included in the edge processing profile may be applied to one region 820 with the same target film thickness. Different layers may be applied to other regions 830 having a different target film thickness than the region 820.

FIG. 9 is a schematic diagram illustrating a method for forming a film on an edge portion of a shape according to another embodiment of the present disclosure.

As shown in FIG. 9, a first shape, a second shape 910, and a third shape 920 may be set in a target region to print a preset image on the substrate.

The second shape 910 may be a hole shape located inside the first shape, and the third shape 920 may be a hole shape located inside the second shape 910. That is, in the example shown in FIG. 9, the preset image is an image further including another hole shape inside the hole shape.

Before forming a film, a first edge processing profile including target film thickness information and direction information for forming a film according to a distance from the edge portion of the first shape may be set.

In addition, a second edge processing profile including target film thickness information and direction information for forming a film according to a distance from the edge portion 911 of the second shape 910 may be set. The second edge processing profile may be applied independently of the first edge processing profile.

In addition, a third edge processing profile including target film thickness information and direction information for forming a film according to a distance from the edge portion 921 of the third shape 920 may be set. The third edge processing profile may be applied independently of the first edge processing profile and the second edge processing profile.

Since in the conventional method for forming a film, an amount of discharged ink could be controlled only for one edge included in the image, it was impossible to print an image in which an additional film forming region exists inside the region set as a region in which a film is not formed.

The present disclosure is intended to independently form a film on an edge of each shape in an image in which a plurality of shapes overlap, and may be applied to printing an island image in which a film forming region additionally exists inside a region set as the region in which the film is not formed.

For example, as shown in FIG. 9, the edge portion 911 of the second shape may be set such that a film is formed in a second shape expansion direction from an edge line 913 of the second shape outwardly of the second shape 910. In addition, the edge portion 921 of the third shape may be set such that a film is formed in a third shape reduction direction from an edge line 923 of the third shape inwardly of the third shape 920.

When printing an island image as shown in FIG. 9, in a second edge processing profile applied to the edge portion 911 of the second shape, an entire interior of the second shape 910 may be set as a region in which a film is not formed.

A film may be formed on the edge portion 921 of the third shape, based on a third edge processing profile applied independently of the second edge processing profile. In the third edge processing profile, the interior of the third shape 920 overlapping the region set as a region in which a film is not formed in the second edge processing profile may be set as a film forming region.

That is, in the second edge processing profile, film forming density inside the second shape 910 may be set as 0, and in the third edge processing profile, the interior of the third shape 920 may be set to No, where N is a number greater than 0.

In addition, in describing the present disclosure, '-part' or 'unit' may be implemented in various manners, for example, by a processor, program instructions executed by the processor, software modules, microcodes, computer program products, logic circuits, application-specific integrated circuits, firmware, or the like.

The contents of the method disclosed in the embodiments of the present application may be directly implemented by a hardware processor, or may be implemented and completed by a combination of hardware and software modules among processors. The software modules may be stored in storage media of the related art such as random access memory, flash memory, read only memory, programmable read only memory or electrically erasable programmable memory, registers, or the like. The storage medium is located in a memory, and the processor reads the information stored in the memory and combines with the hardware to complete the content of the above method. To avoid duplication, detailed descriptions are omitted herein.

In the process of implementation, each content of the above-described method may be completed by a logic integrated circuit of hardware in a processor or instructions in the form of software. The contents of the method disclosed in the embodiments of the present application may be directly implemented by a hardware processor, or may be implemented and completed by a combination of hardware and software modules among processors. The software modules may be stored in storage media of the related art such as random access memory, flash memory, read only memory, programmable read only memory or electrically erasable programmable memory, registers, or the like. The storage medium is located in the memory, and the processor reads the information stored in the memory and combines the same with the hardware to complete the contents of the above method.

For example, those skilled in the art know that it may be implemented by electronic hardware or a combination of computer software and electronic hardware by combining each exemplary unit and algorithm operation described in the embodiments disclosed in this specification. Whether these functions are performed by hardware or software is determined by the specific application of the technical solution and the design constraints. Those skilled in the art may implement the described functionality using different methods for respective particular applications, but such implementations should not be considered outside the scope of the present application.

In the several embodiments provided in this application, it should be understood that the disclosed devices and methods may be implemented in other manners. For example, the device embodiments described above are merely illustrative, and for example, the division of the unit is only a logical function division, and in actual implementation, other division methods may be provided. For example, a plurality of units or the assembly may be coupled or integrated into one other system, or some features may be ignored or not performed. On the other hand, the couplings or direct couplings or mutual communication connections illustrated or discussed may be indirect couplings or communication connections through some interface, device or unit, and may be electrical, mechanical or other types.

A unit described above as a separate component may be physically separate, and a component indicated as a unit may or may not be a physical unit, for example, may be located in one place or may be distributed over a plurality of network units. According to actual needs, some or all thereof may be selected to realize the purpose of the solution in this embodiment.

That is, each functional unit in each embodiment of the present application may be integrated into one processing unit, each unit may be present alone, or two or two or more units may be integrated into one unit.

If the function is implemented in the form of a software functional unit and sold or used as an independent product, the function may be stored in a single computer readable storage medium. Based on this understanding, the technical solution of this application essentially or contributed to the related art, or a portion of the technical solution may be implemented in the form of a software product, and the computer software product is stored in a single storage medium. Thus, one computer device (which may be a personal computer, server, network device, or the like), including some instructions, may perform all or a portion of the operations of the method described in each embodiment of the present application. Examples of the above-described storage medium include various media capable of storing program codes, such as a USB memory, a mobile hard disk, a read-only memory (ROM), a random access memory (RAM), a magnetic disk, or a CD-ROM.

As set forth above, according to an embodiment, a method and apparatus for forming a film capable of printing an image in which a plurality of shapes overlap may be provided.

In an embodiment of the present disclosure, a method and apparatus for forming a film capable of independently forming a film on an edge of each shape in the image in which a plurality of shapes overlap may be provided.

While example embodiments have been illustrated and described above, it will be apparent to those skilled in the art that modifications and variations could be made without departing from the scope of the present disclosure as defined by the appended claims.

What is claimed is:

1. A method for forming a film, comprising:
setting a first shape within a target region;
setting a second shape, at least partially overlapping the first shape;
setting an edge processing profile applied to an edge portion of the first shape and an edge portion of the second shape; and
forming a film on the edge portion of the first shape and the edge portion of the second shape, based on the edge processing profile.

2. The method for forming a film of claim 1, wherein the operation of forming a film is performed on the edge portion of the first shape and the edge portion of the second shape in one of a shape expansion direction or a shape reduction direction.

3. The method for forming a film of claim 1, wherein the operation of setting the edge processing profile comprises
setting a first edge processing profile including target film thickness information and direction information for forming a film according to a distance from the edge portion of the first shape; and
setting a second edge processing profile including target film thickness information and direction information for forming a film according to a distance from the edge portion of the second shape, and applied independently of the first edge processing profile.

4. The method for forming a film of claim 3, wherein the second shape is a hole shape disposed inside the first shape, and
the second edge processing profile forms a film on the edge portion of the second shape in a second shape expansion direction from an edge line of the second shape outwardly of the second shape.

5. The method for forming a film of claim 3, wherein the second shape is a hole shape disposed inside the first shape, and
the second edge processing profile forms a film on the edge portion of the second shape in a second shape reduction direction from the edge line of the second shape inwardly of the second shape.

6. The method for forming a film of claim 3, wherein the second shape is a hole shape disposed inside the first shape, wherein the method for forming a film further comprises,
setting a third shape, which is a hole shape disposed inside the second shape; and
setting a third edge processing profile including target film thickness information and direction information for forming a film according to a distance from an edge portion of the third shape, and applied independently of the first edge processing profile and the second edge processing profile.

7. The method for forming a film of claim 6, wherein the second edge processing profile forms a film on the edge portion of the second shape in a second shape expansion direction from an edge line of the second shape outwardly of the second shape, and
the third edge processing profile forms a film on the edge portion of the third shape in a third shape reduction direction from an edge line of the third shape inwardly of the third shape.

8. The method for forming a film of claim 1, wherein the edge processing profile comprises position information of a region in which a film is not formed among the target regions.

9. The method for forming a film of claim 1, wherein the edge processing profile comprises a plurality of layers with different target film thicknesses, and
the plurality of layers are sequentially applied to regions with the same target film thickness among the target regions.

10. An apparatus for forming a film, comprising:
a substrate disposition unit on which a substrate including a target region is disposed;
a film forming unit for forming a film on a preset image on the substrate; and
a control unit controlling the film forming unit,
wherein the control unit sets a first shape within the target region,
sets a second shape, at least partially overlapping the first shape,
sets an edge processing profile applied to an edge portion of the first shape and an edge portion of the second shape, and
controls the film forming unit to form a film on the edge portion of the first shape and the edge portion of the second shape, based on the edge processing profile.

11. The apparatus for forming a film of claim 10, wherein the control unit controls the film forming unit to form a film on the edge portion of the first shape and the edge portion of the second shape in one of a shape expansion direction or a shape reduction direction.

12. The apparatus for forming a film of claim 10, wherein the control unit sets a first edge processing profile including target film thickness information and direction information for forming a film according to a distance from the edge portion of the first shape, and
sets a second edge processing profile including target film thickness information and direction information for forming a film according to a distance from the edge portion of the second shape, and applied independently of the first edge processing profile.

13. The apparatus for forming a film of claim 12, wherein the film forming unit comprises a nozzle discharging ink onto the substrate,
wherein the control unit controls a discharge amount of the nozzle to form a film on the edge portion of the second shape in a second shape expansion direction from an edge line of the second shape outwardly of the second shape, based on the second edge processing profile.

14. The apparatus for forming a film of claim 12, wherein the film forming unit comprises a nozzle discharging ink onto the substrate,
wherein the control unit controls a discharge amount of the nozzle to form a film on the edge portion of the second shape in a second shape reduction direction from an edge line of the second shape inwardly of the second shape, based on the second edge processing profile.

15. The apparatus for forming a film of claim 12, wherein the second shape is a hole shape disposed inside the first shape,
wherein the control unit sets a third shape, which is a hole shape disposed inside the second shape, and
sets a third edge processing profile including target film thickness information and direction information for forming a film according to a distance from an edge portion of the third shape, and applied independently of the first edge processing profile and the second edge processing profile.

16. The apparatus for forming a film of claim 15, wherein the film forming unit comprises a nozzle discharging ink onto the substrate,
wherein the control unit controls a discharge amount of the nozzle to form a film on the edge portion of the second shape in a second shape expansion direction from an edge line of the second shape outwardly of the second shape, based on the second edge processing profile, and
controls the discharge amount of the nozzle to form a film on the edge portion of the third shape in a third shape reduction direction from an edge line of the third shape inwardly of the third shape, based on the third edge processing profile.

17. The apparatus for forming a film of claim 10, wherein the edge processing profile comprises position information of a region in which a film is not formed among the target regions.

18. The apparatus for forming a film of claim 10, wherein the edge processing profile comprises a plurality of layers with different target film thicknesses, and
the control unit controls the film forming unit to sequentially apply the plurality of layers to regions with the same target film thickness among the target regions.

19. An apparatus for forming a film, comprising:
a substrate disposition unit on which a substrate including a target region is disposed;
a nozzle discharging ink onto the substrate;
a nozzle moving unit moving the nozzle; and
a control unit controlling the nozzle and the nozzle moving unit,
wherein the control unit sets a first shape, a second shape, which is a hole shape disposed inside the first shape, and a third shape, which is a hole shape disposed inside the second shape, within the target region,
sets an edge processing profile including target film thickness information and direction information for forming a film according to a distance from an edge portion of the first shape, an edge portion of the second shape, and an edge portion of the third shape,
controls a discharge amount of the nozzle to form a film on the edge portion of the second shape in a second shape expansion direction from an edge line of the second shape outwardly of the second shape, based on the edge processing profile, and controls the discharge amount of the nozzle to form a film on the edge portion of the third shape in a third shape reduction direction from an edge line of the third shape inwardly of the third shape, based on the edge processing profile.

20. The apparatus for forming a film of claim 19, wherein the edge processing profile comprises position information of a region in which a film is not formed among the target regions, and in the edge processing profile applied to the edge portion of the second shape, an interior of the second shape is set as a region in which a film is not formed.

* * * * *